US011532022B2

(12) United States Patent
Aswani et al.

(10) Patent No.: US 11,532,022 B2
(45) Date of Patent: Dec. 20, 2022

(54) SYSTEMS METHODS CIRCUITS AND ASSOCIATED COMPUTER EXECUTABLE CODE FOR DIGITAL CATALOG AUGMENTATION

(71) Applicant: Klevu Oy, Espoo (FI)

(72) Inventors: Niraj Aswani, Gujarat (IN); Nilay Oza, Espoo (FI)

(73) Assignee: Klevu Oy, Espoo (FI)

( * ) Notice: Subject to any disclaimer, the term of this patent is extended or adjusted under 35 U.S.C. 154(b) by 0 days.

(21) Appl. No.: 16/168,964

(22) Filed: Oct. 24, 2018

(65) Prior Publication Data

US 2019/0057426 A1 Feb. 21, 2019

Related U.S. Application Data

(63) Continuation of application No. 15/399,972, filed on Jan. 6, 2017, now abandoned.

(60) Provisional application No. 62/275,252, filed on Jan. 6, 2016.

(51) Int. Cl.
| | |
|---|---|
| *G06Q 30/00* | (2012.01) |
| *G06Q 30/06* | (2012.01) |
| *G06Q 30/02* | (2012.01) |
| *G06F 40/30* | (2020.01) |
| *G06F 40/232* | (2020.01) |
| *G06F 40/253* | (2020.01) |

(52) U.S. Cl.
CPC ....... *G06Q 30/0603* (2013.01); *G06F 40/232* (2020.01); *G06F 40/253* (2020.01); *G06F 40/30* (2020.01); *G06Q 30/0282* (2013.01)

(58) Field of Classification Search
CPC ............ G06Q 30/0603; G06Q 30/0282; G06F 17/273; G06F 17/274; G06F 17/2785

USPC ...................................................... 705/26.35
See application file for complete search history.

(56) References Cited

U.S. PATENT DOCUMENTS

| | | | | |
|---|---|---|---|---|
| 7,620,651 B2 * | 11/2009 | Chea | ..................... | G06Q 30/02 707/750 |
| 8,386,336 B1 * | 2/2013 | Fox | ..................... | G06Q 30/0253 705/26.1 |
| 8,676,970 B2 * | 3/2014 | Boyns | ................ | G06Q 30/0282 709/224 |

(Continued)

OTHER PUBLICATIONS

O'curran, Elaine. "Machine Translation and post-editing for user generated content: An LSP perspective." Proceedings of the 11th Conference of the Association for Machine Translation in the Americas. vol. 2. 2014.*

*Primary Examiner* — Kathleen Palavecino
(74) *Attorney, Agent, or Firm* — KandareIP, LLC; Anthony W. Kandare

(57) ABSTRACT

Disclosed are methods, circuits, devices, systems and functionally associated computer executable code for digital catalog augmentation. A digital catalog interface module reads from a digital catalog data storage, directly or indirectly, one or more catalog data records constituting an offer listing within a digital catalog, wherein the offer listing may include a description of a specific product or service offering and/or links to execute a transaction relating to the offering. The system includes a Review Criteria and Sentiment Extractor (RCSE) to identify and convert one or more reviews posted on a review forum into one or more data records used to augment the offer listing within the digital catalog.

11 Claims, 11 Drawing Sheets

(56) References Cited

U.S. PATENT DOCUMENTS

| | | | | |
|---|---|---|---|---|
| 9,672,555 B1* | 6/2017 | Dillard | ............... | G06Q 30/0631 |
| 2008/0097769 A1* | 4/2008 | Galvin | ................... | G06Q 30/02 |
| | | | | 705/346 |
| 2009/0063247 A1* | 3/2009 | Burgess | ................ | G06Q 30/02 |
| | | | | 705/7.34 |

* cited by examiner

DIGITAL CATALOG PRODUCT DESCRPTION TABLE (e.g. OFFERING'S DATA STORE RECORD)
MULTIPURPOSE PAIR OF BICYCLE – PRIOR TO CATALOG ENRICHMENT/AUGMENTATION

| DESCRIPTION TEXT | CRITERIA | SENTIMENT |
|---|---|---|
| PROFESSIONAL SHIMANO GEARS | GEARS | HIGHLY POSITIVE |
| MULTI-TERRAIN TIRES | TIRES | POSITIVE |
| AFFORDABLE PRICE | PRICE | POSITIVE |
| ADAPTABLE FOR A RANGE OF RIDER AGES AND SIZES | RIDER AGES AND SIZES | HIGHLY POSITIVE |

FIG. 4A

SYSTEM SCRAPED CONSUMER REVIEW - MULTIPURPOSE PAIR OF BICYCLE – IDENTIFIED CRITERIA AND SENTIMENTS HIGHLIGHTED

FORM THE FIRST SIGHT I LIKED THE CHROME PALTED FRAME, IT LOOKS GOOD AND SEEMS VERY DURABLE.

I TOOK THE BICYCLE FOR A LONG, ON AND OFF-ROAD, RIDE, BUT THE CONFTORBALE SEAT AND ADJUSTABLE SHOCK ABSORBERS MADE IT A VERY SMOOTH ONE, WHILE THE MULTI-TERRAIN TIRES WORKED WELL ON BOTH ROAD AND OFF-ROAD TARILS.

THE HEADLIGHT, HOWEVER, KEPT MOVING ON ITS AXIS AS I HIT OFF-ROAD BUMPS, CAUSING IT TO POINT DOWN – WHAT BECAME QUITE A NUISANCE AS THE SUN SET DOWN.

MY OLD CHILD SEAT (I RIDE FOR 5 YEARS NOW – CONTINUESLY IMPROVING MY PHYSICAL SHAPE AND SPIRIT) CONNECTED EASILY TO THE BICYCLE.

FOR A FAIR PRICE I WOULD DEFINITELY RECOMMEND THIS PAIR TO MY BEGINNER-INTERMIDIATE RIDING FRIENDS WHO MOSTLY GO ON THE ROAD BUT LIKE SOME OFF-ROAD ACTION OVER THE WEEKEND.

FIG. 4B

SYSTEM EXTRACTED CRITERIA [NEW CRITERIA TYPE] [SENTIMENT] [ACTION TRIGGERED THEREBY]

- CHROME PALTED FRAME LOOKS GOOD AND IS DURABLE [FEATURE] [POSITIVE] [ADD]

- COMFORTABLE SEAT, ADJUSTABLE SHOCK ABSORBERS AND MULTI-TERRAIN TIRES WORK WELL OFF-ROAD [FEATURES & SUTABILITY] [HIGHLY POSITIVE] [ADD SEAT AND ABSORBERS, DO NOT ADD TIRES COMMENT – EXISTING CRITERIA]

- HEAD LIGHT (CONNECTION) PROBLEMATIC [FEATURE] [NEGATIVE] [REPORT TO OFFERING POC]

- CHILD SEAT EASILY CONNECTABLE [COMPATIBILITY] [POSITIVE] [ADD]

- IMPROVES PHYSICAL SHAPE AND SPIRIT [OUTCOME] [HIGHLY POSITIVE] [ADD]

- FAIR PRICE [GENERAL/OVERALL CHARACTERISTIC/FEATURE] [POSITIVE] [DO NOT ADD – EXISTING CRITERIA]

- (HIGHLY RECOMEDED FOR) BEGINNER-INTERMIDIATE RIDING FRIENDS [SUITABILITY] [HIGHLY POSITIVE] [ADD]

FIG. 4C

DIGITAL CATALOG PRODUCT DESCRPTION TABLE (e.g. OFFERING'S DATA STORE RECORD) MULTIPURPOSE PAIR OF BICYCLE – FOLLOWING TO CATALOG ENRICHMENT/AUGMANTATION

| DESCRIPTION TEXT | CRITERIA | SENTIMENT |
|---|---|---|
| PROFESSIONAL SHIMANO GEARS | GEARS | HIGHLY POSITIVE |
| MULTI-TERRAIN TIRES | TIRES | POSITIVE |
| AFFORDABLE PRICE | PRICE | POSITIVE |
| ADAPTABLE FOR A RANGE OF RIDER AGES AND SIZES | RIDER AGES AND SIZES | HIGHLY POSITIVE |
| CHROME PALTED FRAME LOOKS GOOD AND IS DURABLE | FRAME | POSITIVE |
| COMFORTABLE SEAT, ADJUSTABLE SHOCK ABSORBERS | SEAT | HIGHLY POSITIVE |
|  | SHOCK ABSORPTION | HIGHLY POSITIVE |
| CHILD SEAT EASILY CONNECTABLE | CHILD SEAT | POSITIVE |
| IMPROVES PHYSICAL SHAPE AND SPIRIT | FITNESS AND SPIRIT | HIGHLY POSITIVE |
| (RECOMEDED FOR) BEGINNER-INTERMIDIATE RIDING FRIENDS | USER SUITABILITY / USE CASES | HIGHLY POSITIVE |

FIG. 4D

SYSTEMS METHODS CIRCUITS AND ASSOCIATED COMPUTER EXECUTABLE CODE FOR DIGITAL CATALOG AUGMENTATION

RELATED APPLICATIONS

The present application claims priority from U.S. Provisional Patent Application No. 62/275,252 filed on Jan. 6, 2016 and titled: 'Systems Methods Circuits and Associated Computer Executable Code for Opinion Mining on Consumer Reviews and Applications thereof'. The full disclosure of the 62/275,252 Provisional Patent Application is hereby incorporated by reference in its entirety.

FIELD OF THE INVENTION

The present invention generally relates to the fields of online content publishing. More specifically, the present invention relates to methods, circuits, devices, systems and functionally associated computer executable code for augmenting digital catalogs, for example, augmenting online catalogs using data mining and automated analysis of offering reviews.

BACKGROUND

Opinions on products left on e-commerce websites and social media sites have hidden golden dust for merchants. Often consumer reviews are available in large quantity. Whilst it is difficult for a merchant to read all of the reviews available, limiting the number to a few can result into a biased consumer view.

Sentiment analysis is useful to understand overall mood in the market for specific things. Typically the sentiment summarizers, or feature based recommenders, work by maintaining a set of features, pre identified from the product descriptions. In such systems, vectors are used for maintaining counts of likes and dislikes, often with time-series data. Such systems fail to accommodate any new features other than those pre identified. This is where opinion mining is helpful.

Some of the existing solutions use keywords to search and analyze the results, wherein consumers may provide their aspired preferences (e.g. specifying symptoms, compatibility criteria and subjective hints; requesting trendy products and those that are better than user specified brands). It is still beyond most merchant's capability to: collect such information in today's fast pace and large volume e-commerce environments, analyze the information, update product catalogs based on the analysis and provide a sophisticated search system that understands consumer's queries.

Accordingly, there remains a need, in the field of online content publishing and e-commerce, for solutions that may process unstructured text, such as customer reviews/comments, to identify: new features beyond those pre identified from the product descriptions, the sentiment of customers (e.g. appraisal expressions) towards the newly identified features of the product, the general likes and dislikes of consumers and consumer groups, strengths and weaknesses of products and services being sold, consumers' wish lists, other competitors' strengths and weaknesses and the like. Such insights can help merchants identify the right 'calls for actions', for example, by allowing merchants to automatically enrich the descriptions of their offerings within digital catalogs and/or to report, remove, or present alternatives, to offerings triggering negative reviews and sentiment.

SUMMARY OF THE INVENTION

The present invention includes methods, circuits, devices, systems and functionally associated computer executable code for augmenting a digital catalog, which catalog may comprise network accessible data representing one or more product or service offerings (herein after referred to as offering or offerings). A digital catalog according to embodiments may include and/or otherwise be associated with an e-commerce transaction system which allows a catalog viewer to purchase an offering listed in the catalog. A digital catalog according to embodiments may also include, or be otherwise functionally associated with, one or more online review zones where purchasers, consumers or users of a listed offering may submit for posting a review providing an (preferably personal) assessment of one or more characteristics or attributes of the offering. According to some embodiments of the present invention, there may be provided a digital catalog augmentation system which may modify digital catalog data relating to a specific digital catalog offering as a function of an automated analysis of one or more reviews of the specific offering.

A review scraper integral or otherwise functionally associated with the digital catalog augmentation system may access and/or otherwise read reviews of one or more offerings listed in a digital catalog. The scraper may read reviews posted on the digital catalog review zone, on a review zone linked to or otherwise associated with the digital catalog, and/or to any Internet accessible server where reviews of products or services offered on the digital catalog may be posted.

According to some embodiments, review zones, Internet server posted reviews and/or other sources of reviews linked to, or otherwise associated with, the digital catalog may further include: (1) any third party services allowing merchants, retailers, producers, or distributers, to collect reviews, comments, opinions and/or feedback; (2) social media sites; and/or (3) chat scripts exchanged between users and/or between users and agents.

An automated review analyzer integral or otherwise functionally associated with the digital catalog augmentation system may include: (1) a Review Text Normalizer for normalizing and correcting text of consumer reviews; and/or (2) a Review Criteria and Sentiment Extractor for identifying, extracting and characterizing: (a) the source, target and/or features of consumer reviews/comments, and/or (b) new criteria, relating to offering(s) in the digital catalog, and the sentiment expressed towards the new criteria within the review/comment.

According to some embodiments, the System's Review Text Normalizer may: (1) correct spelling mistakes within the text of consumer reviews; (2) correct grammar mistakes within the text of consumer reviews; and/or (3) handle mixed code language within consumer reviews, in which multiple languages are used within the same text section (e.g. same sentence, same paragraph), by correcting transliterated language at least partially based on domain specific spell correction.

According to some embodiments, the System's Review Criteria and Sentiment Extractor may identify, within the normalized and corrected text, new criteria by which to characterize an offering within a digital catalog, wherein new criteria may include: (1) features not mentioned in the catalog; (2) suitability and/or use cases not mentioned in catalog; (3) compatibility and/or use combinations, with other products, not mentioned in the catalog; and/or (4) possible outcomes of usage, etc. The system's Review Criteria and Sentiment Extractor may identify and/or extract the sentiment expressed, within the text of the customer review/comment, towards the identified new criteria.

According to some embodiments, the system's one or more Feedback Modules and/or Applications may infer and utilize knowledge from reviews and product descriptions for any combination of the following actions:

(1) Removing, suspending and/or deprioritizing the showing or presentation of an offering within the digital catalog; wherein removed, suspended and/or deprioritized catalog offerings may include offerings that received a certain number of harsh/negative reviews and/or offerings that received reviews including a negative sentiment beyond a predefined threshold of negativity level.

(2) Augmenting the digital catalog with data records including new criteria and sentiment relating to offerings therein, as expressed within one or more positive reviews. According to some embodiments, augmenting a digital catalog may refer to any combination of the following actions: (a) modifying digital catalog records to be more correct, attractive and/or to include up to date specific information about the product/service of the digital catalog offering(s); (b) replacing digital catalog records with more current and/or up to date records, wherein more current and/or up to date information may relate to product/service specific information/specifications; and/or (c) appending additional information to existing digital catalog records and/or appending new records.

(3) Identifying, within a review with a negative sentiment, the specific targeted feature(s) of the offering towards which the negative sentiment was expressed and augmenting the digital catalog, by auto-responding to the review with a negative sentiment with a listing/presentation of other versions of the offering (e.g. alternative versions of products), wherein the listed/presented other versions of the offering may include variations, or different options, to the specific feature(s) of the offering that were the target of the negative sentiment.

And/or (4) generating reports, or descriptions/updates, relating to reviews including negative sentiment(s); wherein generated reports may be relayed to a retailer and/or a producer of the digital catalog offering's product or service which is the subject of the review, thus providing the retailer/producer with details of the negative sentiment and/or the criteria and possibly product/service features to which it relates, allowing him to correct or improve specific aspects of the product or service of the offering. Negative sentiment review reports/descriptions/updates may, for example, include: (a) details of the corresponding catalog offering; (b) details of the product/service features which were the target of the review; and/or (c) new criteria addressed and identified in the review and sentiment thereof.

According to some embodiments, the system's one or more Feedback Modules and/or Applications, as part of, or in parallel to, augmenting the digital catalog, may perform enrichment on the extracted review/comment data to be augmented into the digital catalog offering(s) records. Terms, titles and/or descriptions extracted from a review/comment may be substituted with corresponding terms, expressions, synonyms, parallel terms and/or semantic normalizations. For example: the word 'durable' may be substituted with the expression 'long lasting'; the term 'child' may be substituted with word 'kid'; the title 'a 13 years old boy' may be substituted with 'teenager', and or the term 'wife' may be substituted, or broadened, to 'female' (gender), 'woman' and 'adult'. Substitute terms or descriptions may be registered to a system data store in addition and association to their respective terms, wherein some or all of the registered substitute terms may be augmented into corresponding digital catalog offering(s) records. The registered and/or augmented substitute terms may be selected at least partially based on an estimation of their positive effect on a potential customer to the corresponding offering(s).

According to some embodiments, the system may assess the credibility and/or trustworthiness of specific digital catalog offerings reviewers and may allocate weights to specific reviews' criteria and sentiments based thereof. Credibility and/or trustworthiness assessment of a reviewer may be based on any combination of the following factors: (1) Whether the reviewer is estimated to be an end-user of the reviewed offering's product or service or whether the review is based on a $3^{rd}$ party/person testimony, wherein end-user reviews may be allocated a higher weight; (2) Whether the reviewer is estimated to be an expert in the field of the offering's product or service, or whether he is a private/unprofessional user, wherein expert reviews may be allocated a higher weight; (3) Whether the reviewer, based on his history of reviews, tends to focused on a specific domain(s) of digital catalog offerings (e.g. mobile communication devices), or whether his history of reviews relates to a substantially wide range of offerings' fields/domains, wherein reviews made by reviewers having a more domain/field focused reviews history may be allocated a higher weight; and/or (4) Whether the reviewer, based on his history of reviews or based on a specific review made, tends to provide, or provided a specific, concise review(s), wherein more concise reviews and/or reviews of more concise reviewers may be allocated a higher weight.

According to some embodiments, customer reviews/comments, whether positive or negative, may be filtered out from consideration. Based on the analysis of the content of the review/comment and/or based on the assessed credibility or trustworthiness of the reviewer which is the source of the review, as described above. Filtered out reviews/comments may, for example, include: (1) reviews/comments estimated to be fake; (2) reviews/comments estimated to have been made for fun or as a joke; and/or (3) reviews/comments estimated to have been made for political reasons.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

FIG. 4A shows a digital catalog product description table, for an exemplary multipurpose pair of bicycle, prior to a review based augmentation/enrichment process, in accordance with some embodiments of the present invention;

FIG. 4B shows a system scraped review of the multipurpose pair of bicycle, in accordance with some embodiments of the present invention;

FIG. 4C shows exemplary criteria and sentiments, extracted from the multipurpose pair of bicycle review, in accordance with some embodiments of the present invention; and FIG. 4D shows a digital catalog product description table, for an exemplary multipurpose pair of bicycle, following to a review based augmentation/enrichment process, in accordance with some embodiments of the present invention.

Figure 1A:
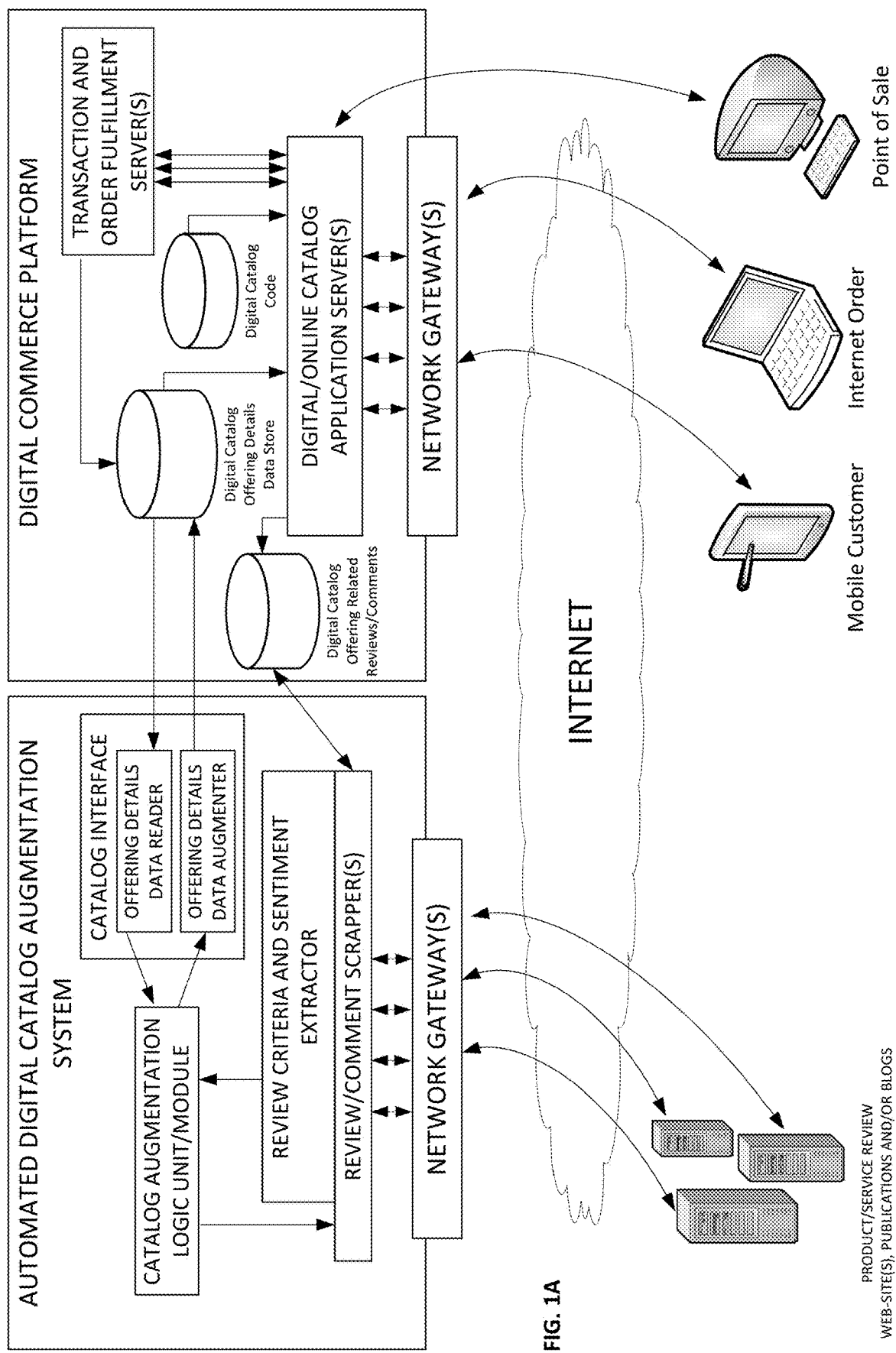
FIG. 1A, is a block diagram of an exemplary system for Automated Digital Catalog Augmentation in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

The present invention generally relates to the augmentation of a digital catalog based on customer or consumer reviews. Throughout the specification, discussions utilizing terms such as "review(s)", "comment(s)", "feedback", "opinion", or the like, may refer to any form of input(s), received or retrieved, relating to any characteristics or properties of a digital catalog offering(s). The source of such reviews may be: a customer, a purchaser, a consumer, a user, a reviewer, an automatic system or robot and/or any other digital catalog offering(s) associated subject or machine—or group thereof.

The present invention includes systems, methods, circuits, and associated computer executable code for opinion mining on consumer reviews and applications thereof. According to some embodiments of the present invention, a system for opinion mining on consumer reviews and applications thereof may comprise: (1) a Review Text Normalizer for normalizing and correcting text of consumer reviews; (2) a Consumer Review Processor for extracting and characterizing the source, target and/or features of consumer reviews and opinions; and/or (3) one or more Feedback Modules and/or Applications for inferring and utilizing knowledge from reviews and product descriptions.

According to some embodiments, a Review Text Normalizer may comprise:
(a) a Consumer Review Spelling Corrector for ensuring product domain specificity and higher accuracy in recognizing misspelled features, wherein spellchecking is based on limited indexing of domain specific dictionaries and product catalogs.
(b) a Consumer Review Grammar Corrector for handling grammatical inconsistencies in consumer reviews by utilizing shallow parsing at the phrase level, for example: "blue color I like not", "I do not like its blue color", wherein as long as certain words of interest appear within a close proximity words may be shuffled around their respective head words, to convey meaning and opinion.
And/or (c) a Transliterated Language Corrector for dealing with mixed code language in consumer reviews, by referencing knowledge base in various languages, converting transliterated reviews, or sections thereof, into original scripts, utilizing domain specific spell correction to obtain the nearest possible words and relaxed grammatical rules to figure out the associated opinion of consumers.

According to some embodiments of the present invention, a Consumer Review Processor may comprise:
(a) A Reviewer Analysis Classification and Characterization Module for processing consumer reviews to extract source and estimate if a reviewer is trustworthy/useful source, his review's weight, and/or whether ho is an expert and/or a genuine consumer.
According to some embodiments a Reviewer Analysis Classification and Characterization Module for processing consumer reviews may implement one or more of the following methods and techniques, and/or any combination thereof, for reviewer/review analysis and characterization:

According to some embodiments, considering a given reviewer a trustworthy source may at least partially be established based on the level of similarity of the given reviewer's review, and the recommendation(s) it includes, to what a majority of other reviewers say and recommend for the majority of the features of the reviewed product. Whether, and/or to what level, the review is in line with what others say may be established by calculating sentiment score (described hereinafter and in Appendix A) for every feature mentioned in the given reviewer's review and comparing it against the overall 'other reviews averages' of the individual features.

According to some embodiments, considering a given reviewer a trustworthy source may at least partially be established based on whether his reviews are endorsed by other reviewers/consumers, or based on the number of endorsements his reviews receive.

According to some embodiments, considering a given frequent reviewer a trustworthy source may at least partially be established based on analysis of his posts across different reviews, assessment of whether his posts lead to specific domains, and, if his posts do lead to specific domains, the reviewer may be considered a trustworthy source for at least some of those specific domain(s). Reviews on/in other topics/domains by the same reviewer may be treated as any other 'regular' consumer review.

According to some embodiments, considering a given reviewer a trustworthy source may at least partially be established based on analysis of the reviewer's 'author name' and possibly of additional information about the reviewer (e.g. organization name, designation, location) available in the review metadata, and comparing the analyzed data with information available in public Linked Open Datasets (LODs) such as, but not limited to, DBPedia, Yago, Freebase etc. If the review was collected from a website/web-location other than the e-commerce website selling the product, and/or if the identity of the reviewer can be established (e.g. it is listed in one of the (LODs)), than such a person/entity may be considered a trustworthy source. In the absence of a successful reviewer identification, the review may receive the same weights as any other 'regular' review on the website.

According to some embodiments, considering a given reviewer a trustworthy source, and/or the usefulness of a given review, may at least partially be established based on whether the review was posted by an end-user of the product, wherein reviews made by a reviewer estimated to be an end-user are considered more useful and/or trustworthy. Various factors may be taken into consideration for establishing whether a given review was posted by an end-user or not, for example: (i) the presence of first person pronouns (e.g. I, We, My, Our) and verbs indicating experience of using a product (e.g. I tried, We found, In our experience, We used); (ii) the use of non-technical vocabulary in the review, as real consumers tend to focus on the use case of specific features (e.g. commenting on clarity of picture rather than talking about aperture when commenting on a camera); and/or (iii) the level of the reviewer's distancing of himself from the use of difficult/technical vocabulary, wherein a level of similarity (e.g. a cosine similarity) between the text of the review and the product description is calculated; assuming that the more technical the review is the less likely it is that it was written by an end-user, and based on the calculated similarity level, it may be established whether the review was posted by a real consumer or a professional.

According to some embodiments, considering a given reviewer a trustworthy source, and/or the usefulness of a given review, may at least partially be established based on the length of the review. As reviews tend to be short if genuine, longer reviews with presence of second or third person pronouns (e.g. you, they) may suggest that the reviews are posted by professional writers.

(b) A Pronominal Co-reference Resolver for identifying whether an opinion is about the product overall or specific features by identifying pronouns and the main subjects which the pronouns are associated with. If no association can be established between the found pronouns and targets, the product itself may be considered as a target. Phrases without any target in the same sentence or in the nearby context may be automatically associated with the main product itself.

(c) A Product Parts and Features Identifier for identifying parts or features of products being discussed in consumer reviews. Consumer comment on a specific attribute without mentioning the actual value, the value may be obtained from the product's specifications. For example, "its color is . . . ", "I don't like its material", "size could have been bit . . . " etc. Here, values of the mentioned attributes may be obtained from the product's specifications, for example by cross correlating, or identifying, the color/material/size attribute in the consumer review/comment to the item (e.g. product part) he is viewing or examining.

(d) An Idiom Replacer for handling idioms in consumer reviews, wherein based on a dictionary of idioms in different languages, along with their corresponding sentiments as in the positive, negative and neutral form, the dictionary may be used as a source for looking them up in reviews, and optionally replacing them with a matching actual meaning.

(e) A Suitability Phrase Identifier for identifying phrases revealing suitability aspects in consumer reviews, wherein a gazetteer containing predefined sets of words and patterns known to be commonly used for explaining the same may be referenced and utilized for identification, for example, the pattern:

((<ADVERB>)?<ADJ>):opinion (<Noun>)?: category (<Preposition>):prep (<Word>)+:suitableFor; that may match the following phrases:

"blazer is perfect for a business meeting": (perfect):opinion (for):prep (a business meeting):suitableFor; and "the toy was perfect for my 2 years old": (perfect):opinion (for):prep (my 2 years old):suitableFor.

(f) An Opinion Normalizer for aggregating opinions from consumer reviews and normalizing the attitudes (i.e. appreciations or critics) of the consumer, possibly in addition to normalizing the underlying features (i.e. targets), wherein normalizing the attitudes may include enriching them with root forms of the words and contextually relevant synonyms and semantic categories.

And/or, (g) a Sentiment Polarity Calculator for obtaining sentiment polarity in consumer reviews, wherein based on the product cluster to of a given product, and utilizing a comparison API, other similar products in the cluster may be fetched and their reviews aggregated, and the collective text may provide context that is useful to determine the orientation of opinion.

According to some embodiments of the present invention, knowledge inferred from Consumer Review and Product Descriptions may be utilized for updating and/or providing feedback to various e-commerce systems and/or users thereof, exemplary applications may include:

(a) Product Ontology Updating based on Consumer Review Opinions, wherein, regular expressions over annotated reviews may be utilized for identifying unknown use cases of products, thus enabling the inferring of new knowledge about the corresponding reviewed products.

For Example: the consumer language "its color is perfectly suitable for a business meeting" is cross correlated with the respective product's specifications (e.g. a Jacket), inferring that the following statement may be added to the product's ontology (knowledge base): "light gray color is preferred by professionals for business meetings".

(b) Inferring of Dynamic Facets from Consumer Reviews, wherein rule based information engineering methods are utilized to process product descriptions and consumer reviews, while searching for facets not explicitly highlighted by the merchants of the product.

For example: in the consumer language "a perfect gift for infants"—the appraisal expression (i.e. a perfect gift) is identified, and using the rules based information engineering, as described hereinbefore, convert the concerning "noun(s)" into a facet (e.g. gift), and present the facet to consumers/customers searching for products.

(c) Identifying Products with Out-dated Features, wherein features represented as numerical values are tracked and normalized for comparison purposes (e.g. Camera 7MP>5MP), newer models succeeding the previous ones (e.g. iPhone 6 succeeding iPhone 5) are tracked, and phrases added to catalogs for such features are compared with the newer products of the same category and the knowledge base is modified accordingly.

(d) Updating Product Catalogs Using Consumer Reviews, wherein phrases with positive sentiments in the reviews are identified and then 'injected' back into the product catalog allowing searches to be performed on newly discovered features.

An exemplary overall system of processing consumer reviews to update product catalogs may execute some or all of the following steps, and/or any combination thereof:

normalizing the text of consumer reviews to get rid of spell errors;

using a microblog friendly POS tagger to annotate tokens with grammatical tags using shallow parsing techniques to find out sources and appraisal expressions that express attitudes and targets;

assigning appropriate weights to the reviews by identifying if a review was written by end-users, professionals, manufacturers or spammers;

assigning to the respective features, a calculated polarity of attitudes including those represented by idioms;

recognizing phrases used for explaining suitability aspects, based on which new facets and suitability expressions are added to the product catalogs; and readjusting the ranking of products with out-dated features.

And/or (e) Real-time Analysis of Consumer Reviews to Avoid Negative Reviews, wherein text of reviews being written by consumers may be monitored in real-time, consumer's dislikes (i.e. the target and the attitude) are identified in real-time (i.e. prior to the posting of the review) within negative consumer reviews as they are being written or edited, the feature(s) of the product (e.g. color, size) to which the complaint is targeted are identified, and substantially similar products, not including the complained about features, or including variations of these features, are presented and offered to the consumer/customer.

In FIG. 1A, there is shown, in accordance with some embodiments, a block diagram of an exemplary system for Automated Digital Catalog Augmentation. In the figure, the Automated Digital Catalog Augmentation System is shown to be functionally connected to a Digital Commerce Platform. The Digital Commerce Platform includes a digital/online catalog application server(s) for receiving, optionally through the shown network gateway(s), customer and point of sale (POS) orders for offerings included in the digital catalog of the Digital Commerce Platform. The digital/online catalog application server(s) is functionally connected to a transaction and order fulfillment server(s) for executing the received customer and point of sale (POS) orders and for accordingly updating the digital catalog. The digital/online catalog application server(s) is shown to be functionally connected to the following data stores: a digital catalog code data store for storing computer executable code for the generation, application and/or management of the digital catalog; a digital catalog offering details data store for storing details and descriptions of product and/or service offerings included in the digital catalog; and/or a digital catalog offerings related reviews/comments data store for storing feedbacks from customers, consumers and/or other users of product/service offerings in the digital catalog.

The digital/online catalog application server(s) shown, may further receive, optionally through the shown network gateway(s), consumer/customer/other reviews/comments for offerings included in the digital catalog of the Digital Commerce Platform. The digital/online catalog application server(s) may store the received reviews/comments to the digital catalog offering(s) related reviews/comments data store.

Customer and point of sale (POS) orders, and/or consumer/customer/other reviews/comments, may be communicated to the servers over a closed network or a direct communication session (e.g. a POS network/direct/VPN connection), and/or from computerized communication devices, over the Internet and through the network gateway(s) shown.

The computerized communication devices shown in the figure are provided as an example. Various computerized communication devices/systems/components may be utilized to relay/upload digital catalog offerings' orders and/or reviews/comments to the digital/online catalog application server(s). Such devices/systems/components may include, but are not limited to: computing platforms, personal computers, laptops, tablets, smartphones, smartwatches or other wearable devices, Internet robots, smart house devices or appliances and/or any other digital communication/networking able device/system. Furthermore, any of the above listed devices/systems/components may be utilized to relay/upload/post/share/endorse/like digital catalog offerings' reviews/comments/opinions to product/service review web-site(s), publications, blogs, social networks, immediate messaging platform chats.

The Automated Digital Catalog Augmentation System shown, includes a review/comment scraper(s) for retrieving digital catalog offerings reviews/comments from: the digital catalog offerings reviews/comments data store of the Digital Commerce Platform; and/or from one or more product/service review web-site(s), publications, blogs, social networks and/or network messages/chats, accessed through the shown network gateway(s) of the Automated Digital Catalog Augmentation System.

The retrieved digital catalog offerings reviews/comments are relayed to a review text normalizer for correcting grammar and spelling errors in the text, normalizing the text and/or converting transliterated text to original script/language based on knowledge in the domain of respective product/service offerings in the digital catalog.

Corrected and normalized reviews are processed by the shown Review Criteria and Sentiment Extractor, utilizing a natural language processor(s) including a criteria extractor and a sentiment extractor, to identify within the corrected text of the offerings reviews/comments, criteria relating to offering(s) in the digital catalog and the sentiment expressed towards the new criteria within the review/comment.

The shown catalog augmentation and/or offering related sentiment reporting logic unit/module is utilized for estimating, for each received review/comment, whether the review/comment is positive. And, for each review/comment estimated to be positive: (1) comparing the criteria and sentiment, identified within the review/comment, to available digital catalog offering details received through the shown offering details data reader of the catalog interface, wherein the review/comment and the received available digital catalog offering details relate to the product/service of the same offering; (2) generating, for identified review/comment criteria, not found (as part of the comparison) within the received available digital catalog offering details, data records including the new criteria and sentiment as expressed within the review/comment; and (3) utilizing the offering details data augmenter of the catalog interface to augment the digital catalog, by updating the digital catalog offering details data store of the Digital Commerce Platform with the generated data records including the new criteria and sentiment, thus triggering the addition of the new criteria and sentiment to available/existing details/descriptions of offerings in the catalog.

According to some embodiments, for received reviews/comments estimated to be negative, the catalog augmentation and/or offering related sentiment reporting logic unit/module may: (1) augment the digital catalog with alternative products/services including variations to specific features thereof, towards which the negative review sentiment was expressed; and/or (2) remove from presentation, or deprioritize the presentation (e.g. present as later/last catalog offerings option) of, offerings which were the target of the negative review/comment.

Figure 1B:
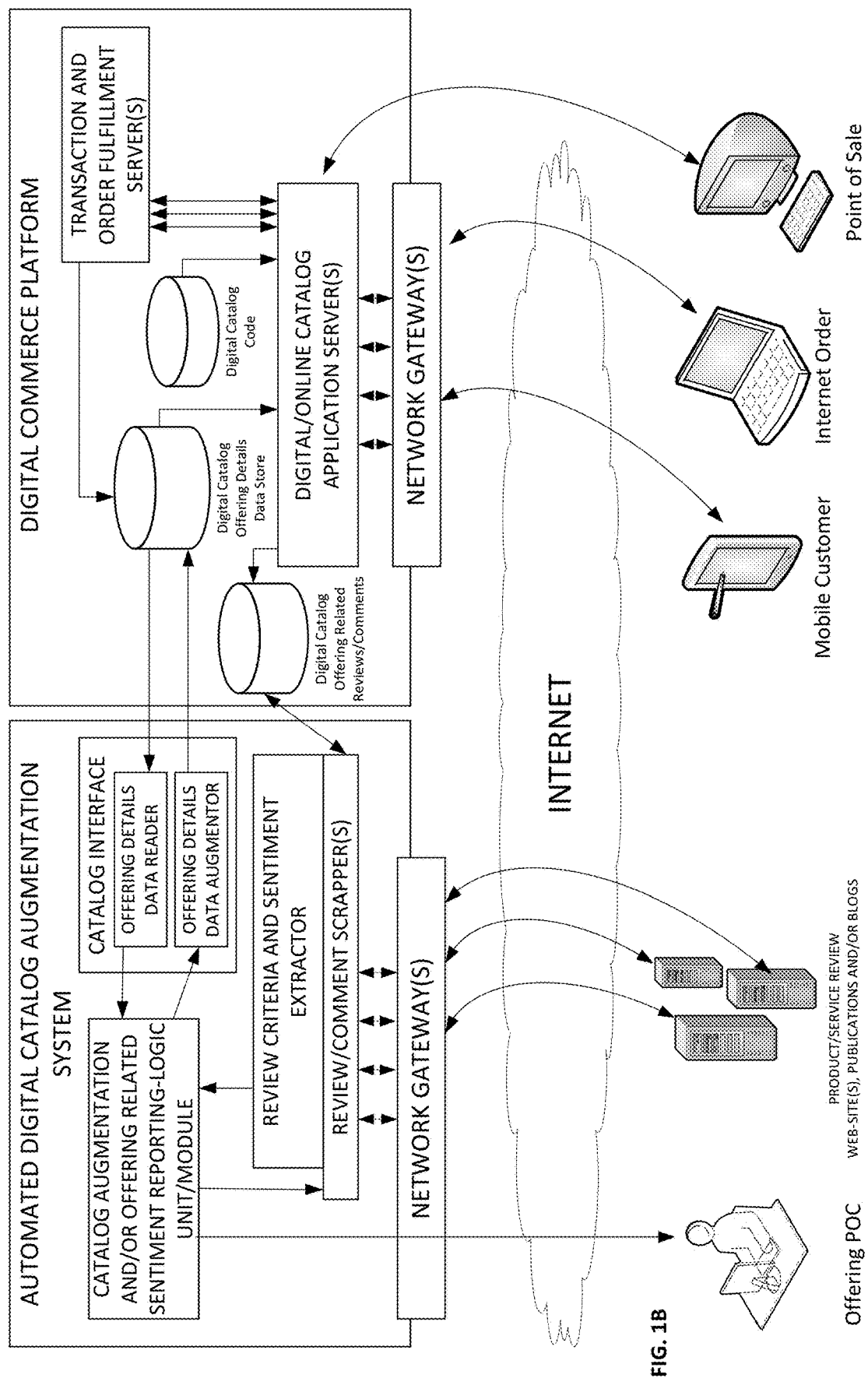
FIG. 1B is a block diagram of the exemplary system for Automated Digital Catalog Augmentation of FIG. 1A, further comprising an offering(s) related sentiment reporting-logic unit/module for compiling and relaying offering related sentiment reports, in accordance with some embodiments of the present invention.

In FIG. 1B there is shown a block diagram of the exemplary system for Automated Digital Catalog Augmentation of FIG. 1A, further comprising an offering(s) related sentiment reporting-logic unit/module for compiling and relaying offering related sentiment reports, including details of negative sentiment expressed in a review/comment and the criteria/feature of the product/offering towards which it was expressed, to offering's point(s) of contact (POC(s)) (e.g. retailer, producer, distributer).

Figure 1C:
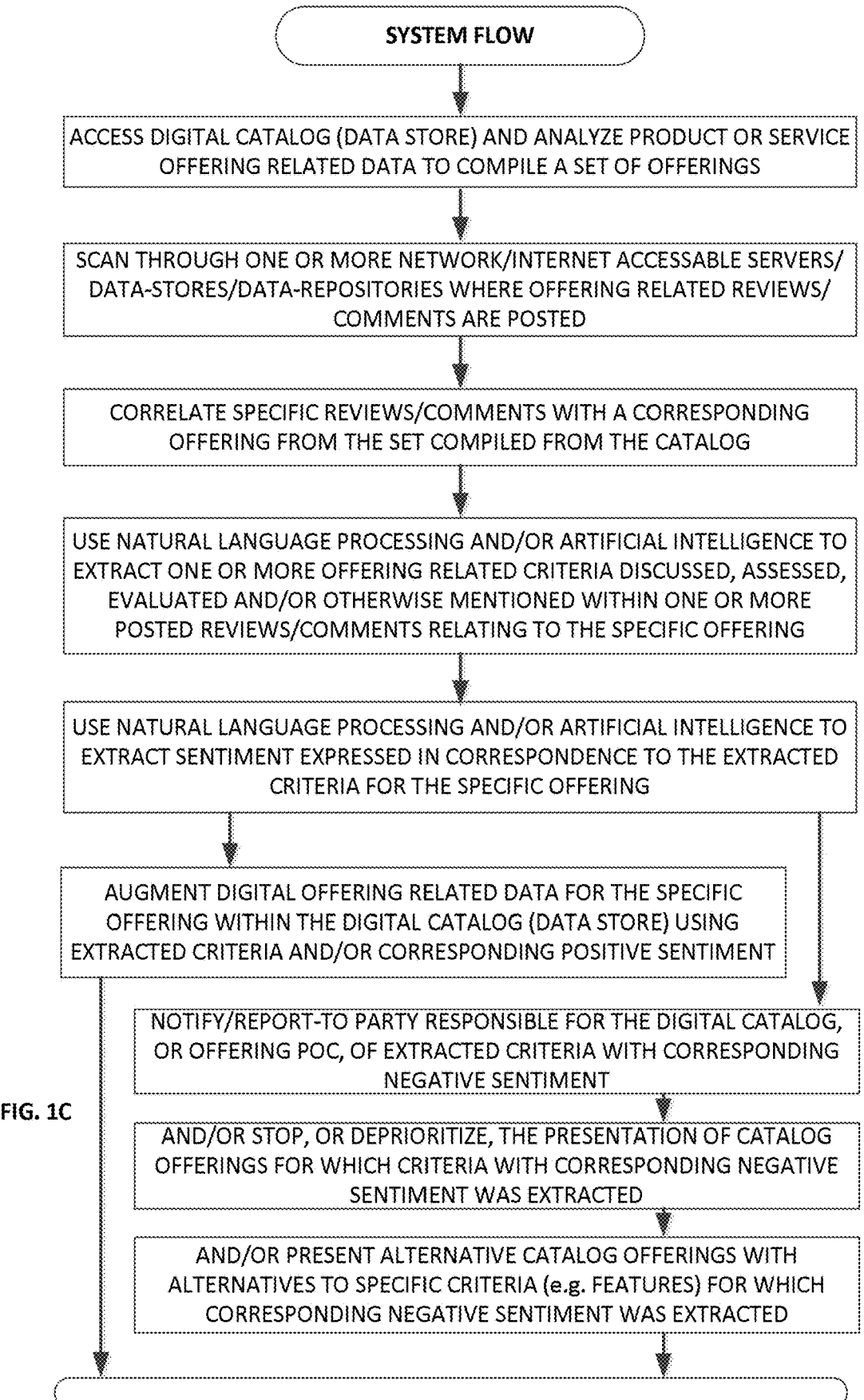
FIG. 1C is a flowchart of the steps executed by the system of FIGS. 1A and 1B as part of an exemplary process for Automated Digital Catalog Augmentation, in accordance with some embodiments of the present invention.

In FIG. 1C there is shown, in accordance with some embodiments, a flowchart of the steps executed by the system of FIGS. 1A and 1B as part of an exemplary process for Automated Digital Catalog Augmentation. The exemplary process shown includes the following steps: (1) Accessing a digital catalog data store and analyzing product or service offering(s) related data to compile a set of offerings; (2) Scanning through one or more network/Internet accessible servers/data-stores/data-repositories where offering(s) related reviews/comments are posted; (3) Correlating specific reviews/comments with corresponding offering(s) within the set compiled from the catalog; (4) Using natural language processing and/or artificial intelligence to extract one or more offering(s) related criteria discussed, assessed, evaluated and/or otherwise mentioned within one or more posted reviews/comments relating to the specific offering(s); and/or (5) Using natural language processing and/or artificial intelligence to extract sentiment expressed in correspondence to the extracted criteria for the specific offering(s).

Positive reviews/comments, including mostly or only positive sentiment towards their respective extracted criteria, triggers: (6) the Augmenting of digital offering(s) related data for the specific offering(s) within the digital catalog (data store), using extracted criteria and/or corresponding positive sentiment.

Negative reviews/comments, including mostly or only negative sentiment towards their respective extracted criteria, triggers (7) any combination of the following: (a) Notifying/Reporting to a party responsible for the digital catalog, or offering(s) point of contact, of extracted criteria with corresponding negative sentiment; (b) Stopping or Deprioritizing the presentation, within the catalog, of catalog offering(s) for which criteria with corresponding negative sentiment was extracted; and/or (c) Presenting alternative catalog offering(s) with alternatives to specific criteria (e.g. product features related criteria) for which corresponding negative sentiment was extracted.

Figure 2A:
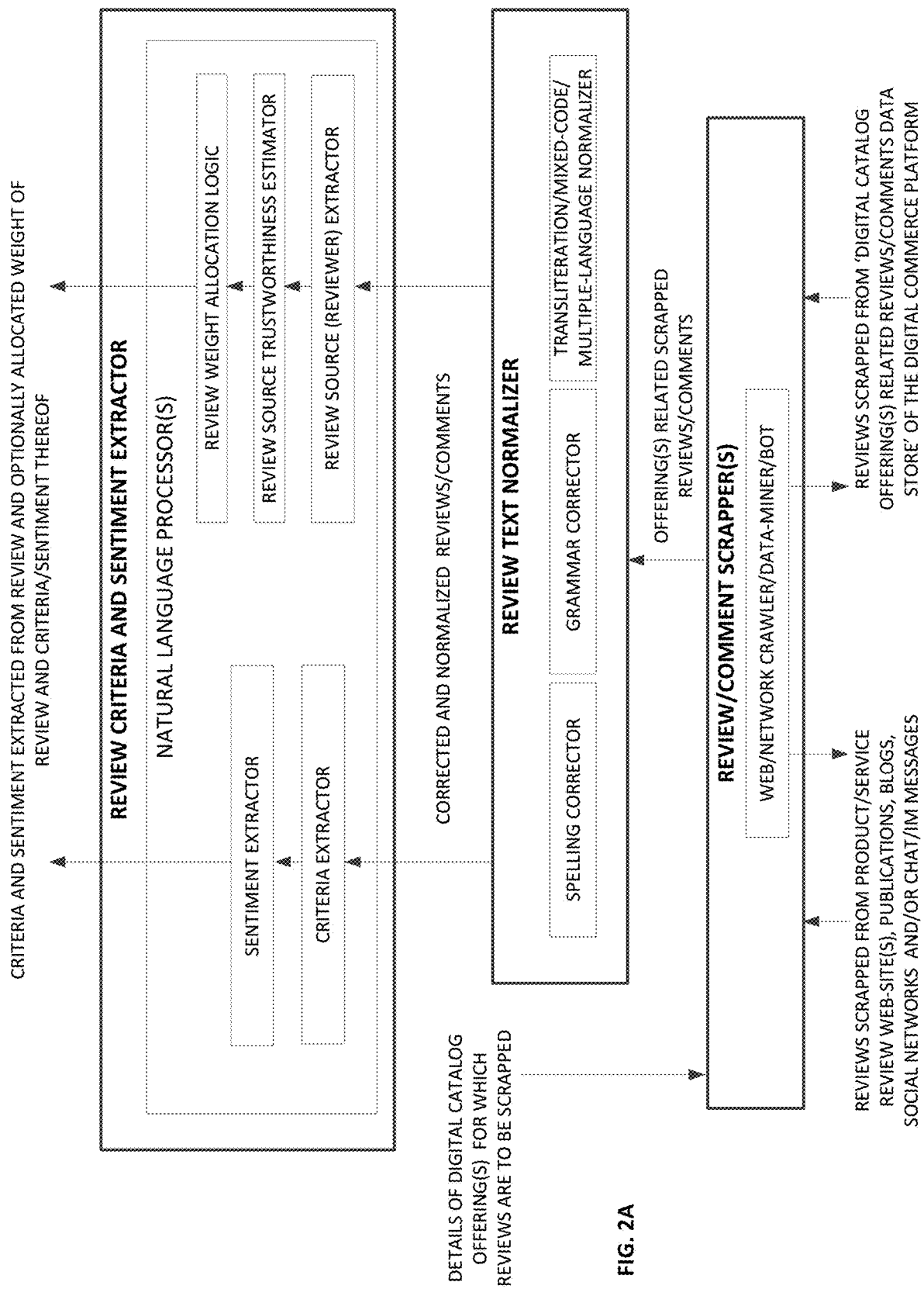
FIG. 2A shows, in greater detail, an exemplary: review/comment scraper, review text normalizer and review criteria and sentiment extractor, in accordance with some embodiments of the present invention.
Figure 2B:
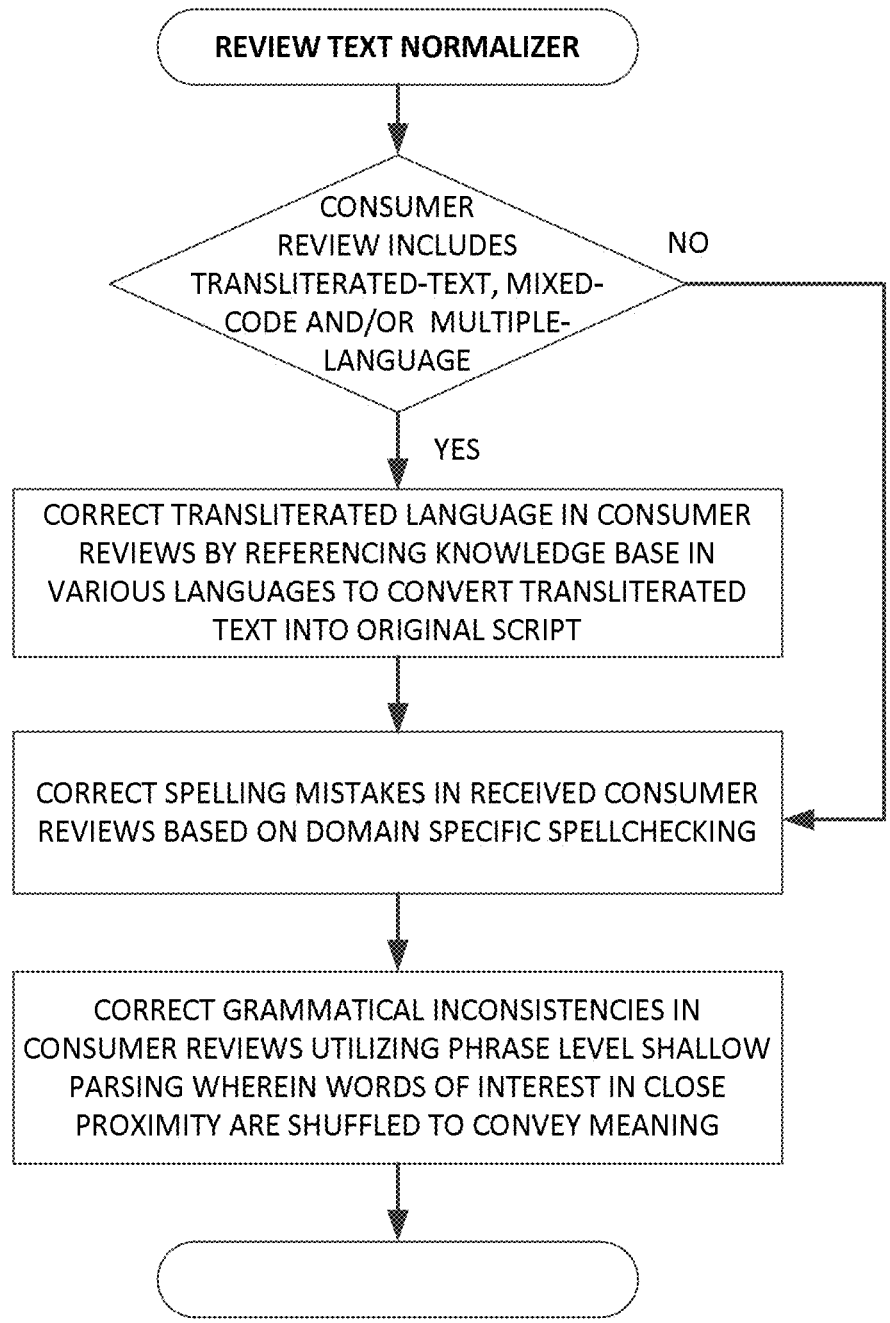
FIG. 2B is a flowchart, showing the steps executed as part of an exemplary process for review text normalization, in accordance with some embodiments of the present invention.
Figure 2C:
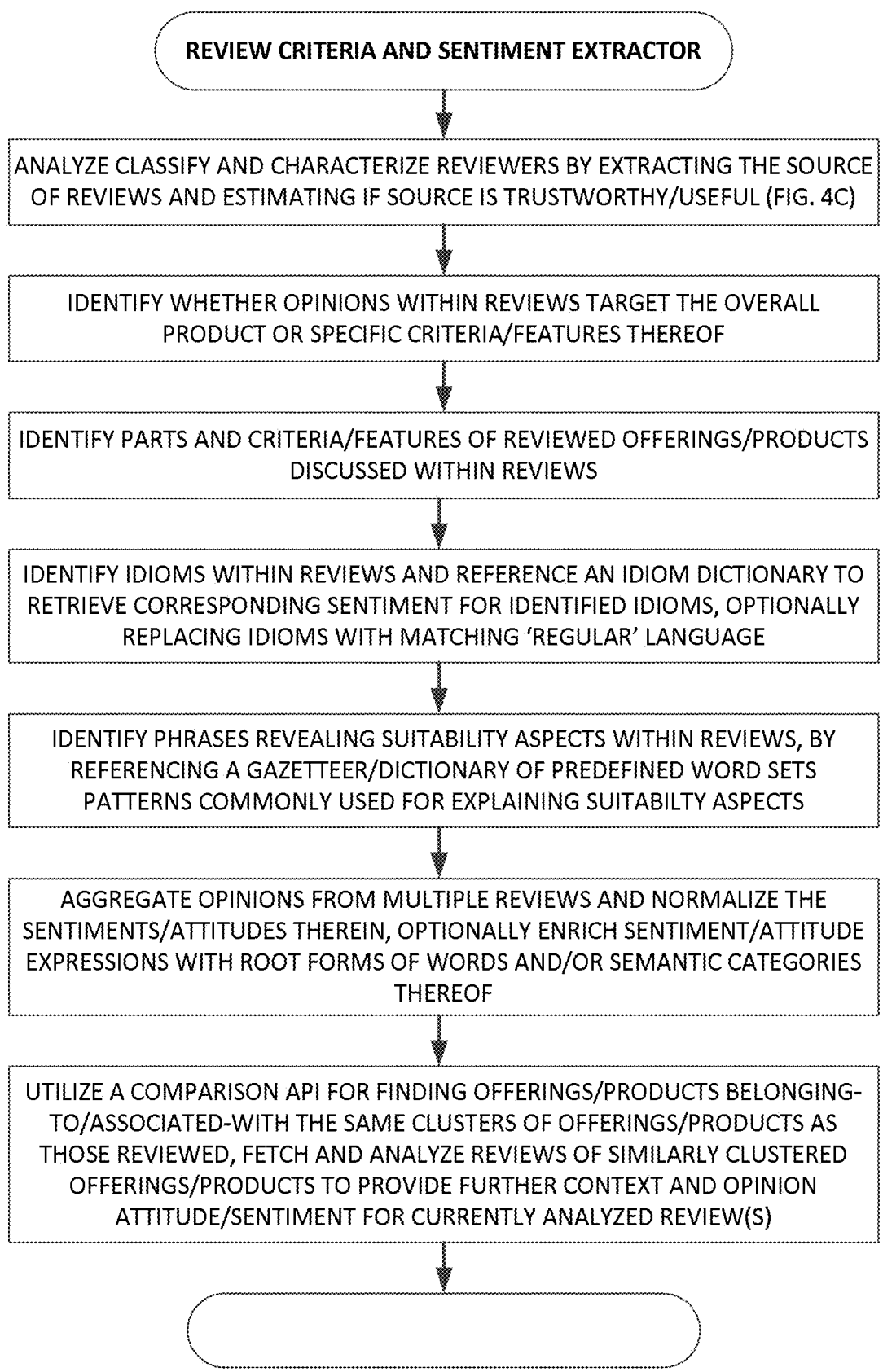
FIG. 2C is a flowchart, showing the steps executed as part of an exemplary process for review criteria and sentiment extraction, in accordance with some embodiments of the present invention.
Figure 2D:
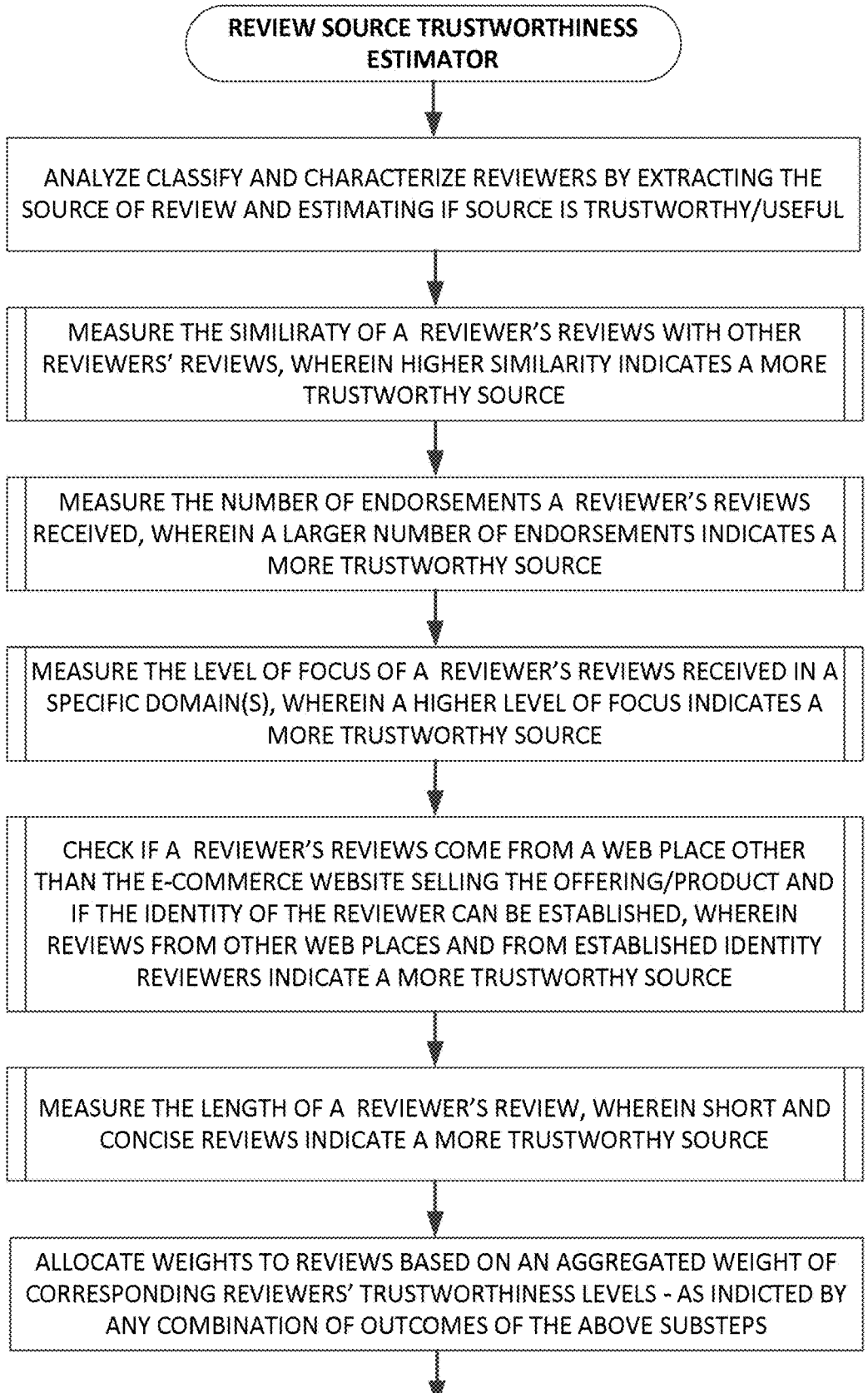
FIG. 2D is a flowchart, showing the steps executed as part of an exemplary process for review source trustworthiness estimation, in accordance with some embodiments of the present invention.

In FIG. 2A there are shown in greater detail, in accordance with some embodiments of the present invention: a review/comment scraper, a review text normalizer and a review criteria and sentiment extractor; the operation of which may be described in conjunction with the steps listed in the flowcharts of FIGS. 2B-2D.

The review/comment scraper of FIG. 2A includes: a web/network crawler, a data miner and/or a robot (bot), for finding and retrieving reviews/comments related to digital catalog offering(s) based on received details of digital catalog offering(s) for which reviews/comments are to be scraped. The details of digital catalog offering(s) for which reviews/comments are to be scraped may be communicated, to the scraper, by the 'catalog augmentation' and/or 'offering related sentiment reporting logic' unit/module (not shown) based on data from the offering(s) details data reader of the catalog interface (not shown).

Reviews/comments are shown to be scraped from the 'digital catalog offering(s) related reviews/comments data store' of the digital commerce platform and/or from product/service review websites, publications, blogs, social networks and/or chat/IM messages.

The operation of the review text normalizer in FIG. 2A may be described in conjunction with the steps listed in the flowchart of FIG. 2B. The shown transliteration/mixed-code/multiple-language normalizer initially scans scraped reviews for transliterated, mixed-code and/or multiple-language occurrences, and normalizes the text by referencing knowledge base in various languages, codes, slangs and/or domains, converting the found text occurrences into an original script, in a single/unified code-type/language.

The shown spell corrector may correct the spelling of the resulting normalized text, optionally utilizing domain specific spellchecking rules, matching the domain of the product/service for which reviews/comments are analyzed.

The shown grammar corrector corrects grammatical inconsistencies in consumer reviews/comments, optionally utilizing phrase level shallow parsing wherein words of interest in close proximity are shuffled (e.g. pseudo randomly) to try and convey meaning.

The operation of the review criteria and sentiment extractor in FIG. 2A may be described in conjunction with the steps listed in the flowchart of FIGS. 2C and 2D. The shown review source (reviewer) extractor analyzes, classifies and characterizes the sources (reviewers) of the corrected and normalized reviews/comments, estimating if and to what level the source is trustworthy/useful. The steps of the trustworthiness estimation process executed by the review source trustworthiness estimator shown in FIG. 2A, are listed and described in further detail in the flowchart of FIG. 2D. the listed steps include: (1) Measuring the similarity of a reviewer's review(s) to reviews made by other reviewers, wherein higher similarity level indicates a more trustworthy source; (2) Measuring the number of endorsements a reviewer's review(s) received, wherein a higher number of endorsements and/or more positive ones, indicate a more trustworthy source; (3) Measuring the level of focus of a reviewer's reviews in specific domain(s), wherein a higher domain focus level indicates a more trustworthy source; (4) Checking the web/network place/origin of a reviewer's review(s) and attempting to establish the reviewer's identity, wherein reviews from web/network places other than the web/network place selling, or directly selling, the product/service of the digital catalog offering and/or reviews from reviewer(s) whose identity was successfully established, indicate a more trustworthy source; and/or (5) Measuring the length of the review, wherein shorter, or more concise, reviews indicate a more trustworthy source.

The review weight allocation logic shown in FIG. 2A, allocates weights to reviews/comments and/or to criteria/sentiment extracted therefrom, based on an aggregated weight of corresponding reviewer's trustworthiness levels—as indicated by any combination of outcomes of the above described reviewer assessment steps.

Returning now to FIG. 2A, there are shown a criteria extractor and a sentiment extractor, the operation of the criteria and sentiment extractors of FIG. 2A may be described in conjunction with the following steps listed in the flowchart of FIG. 2C. the listed steps include: (1) Identifying whether opinions/sentiments within reviews target the overall product/service of the offering, or specific criteria/features thereof; (2) Identifying the specific parts, criteria, components and/or features of the reviewed offering(s) targeted by the review; (3) Identifying idioms within reviews and referencing an idiom dictionary (e.g. digital/web dictionary/repository) to retrieve corresponding sentiment for identified idioms, optionally replacing identified idioms with corresponding 'regular' language expressions; (4) Identifying phrases revealing suitability aspects within reviews, by referencing a dictionary/repository of predefined word sets patterns commonly used for explaining suitability issues; (5) Aggregating opinions from multiple reviews and normalizing the sentiments/attitudes therein, optionally enriching the sentiment/attitude expressions with root forms (e.g. root form tags) of words and/or semantic categories thereof; and/or (6) utilizing a comparison API/logic for finding offerings/products/services belonging to, or associated with, the same types/clusters of offerings/products/services of those reviewed, retrieving and analyzing reviews of similar types, or similarly clustered, offerings/products/services, to provide further context/criteria and opinion attitude/sentiment for currently analyzed offering(s) reviews.

Figure 3A:
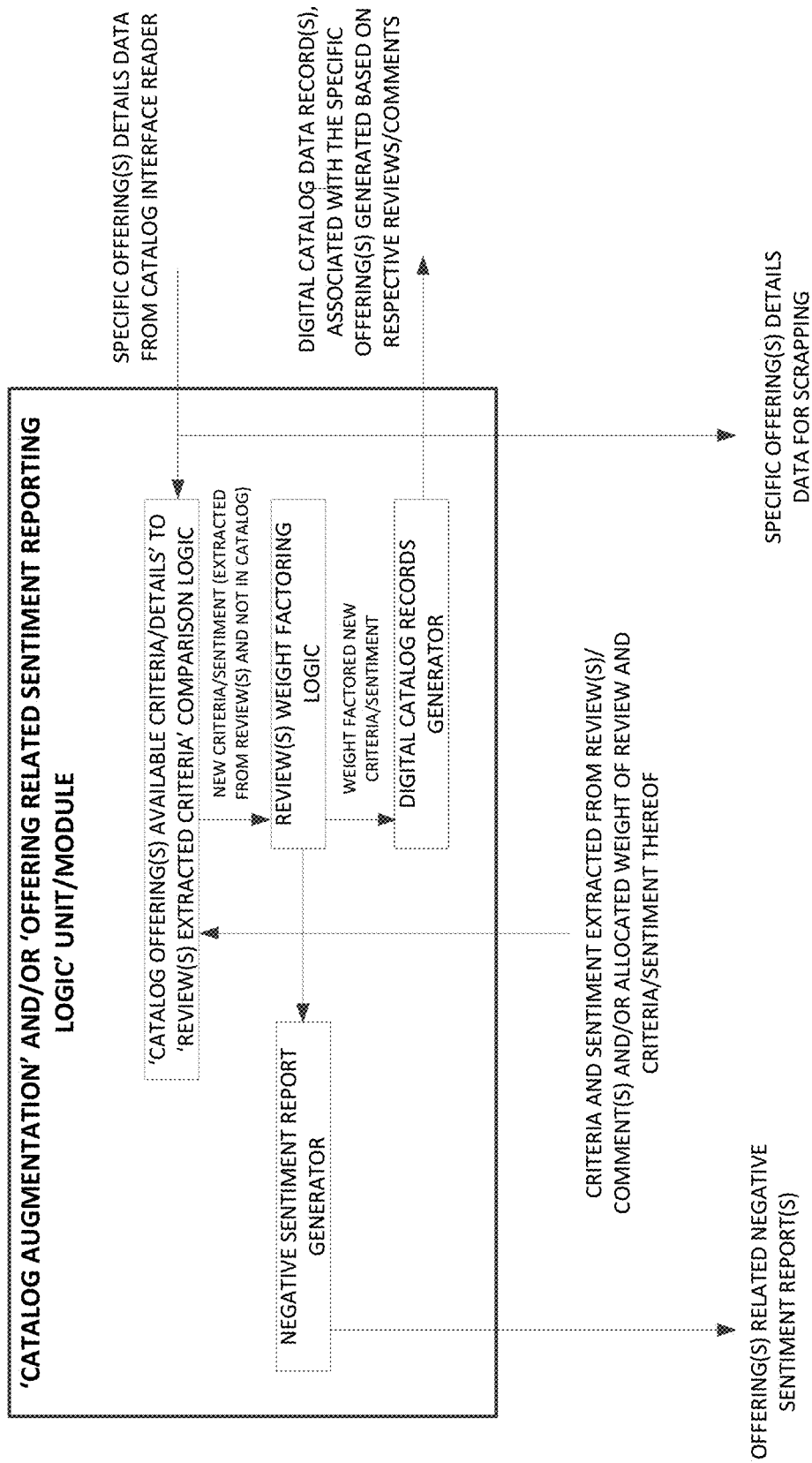
FIG. 3A shows, in greater detail, an exemplary 'catalog augmentation and/or 'offering related sentiment reporting logic' unit/module, in accordance with some embodiments of the present invention.
Figure 3B:
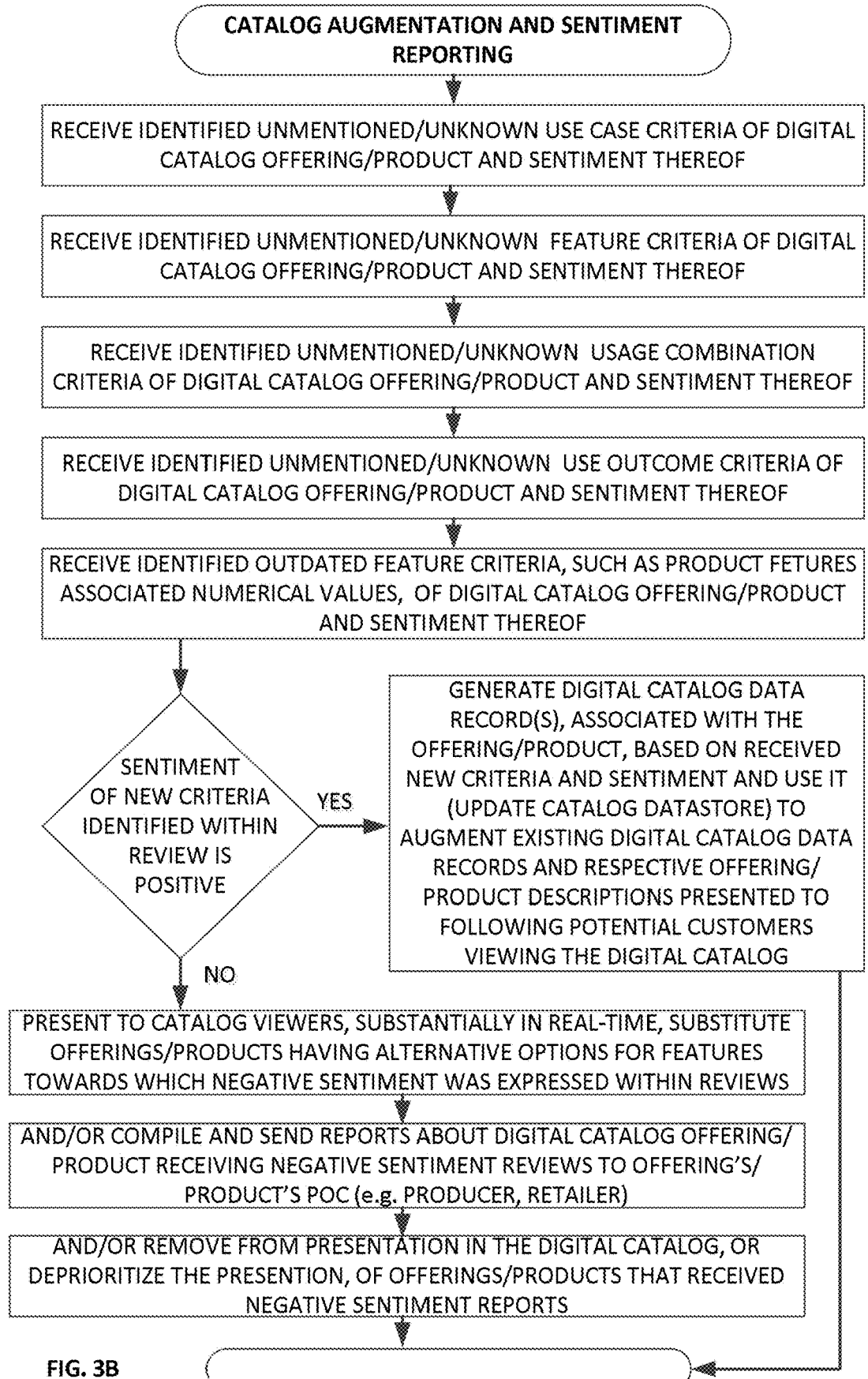
FIG. 3B is a flowchart, showing the steps executed as part of an exemplary process for catalog augmentation and sentiment reporting, in accordance with some embodiments of the present invention.

In FIG. 3A there is shown in greater detail, in accordance with some embodiments of the present invention, a 'catalog augmentation and/or 'offering related sentiment reporting logic' unit/module; the operation of which may be described in conjunction with the steps listed in the flowchart of FIG. 3B.

The 'catalog augmentation and/or 'offering related sentiment reporting logic' unit/module of FIG. 3A relays specific offering(s) related data, received from the catalog interface reader, to the system's review/comment scraper described hereinbefore. In return, the catalog offerings available criteria/details' to 'review(s) extracted criteria' comparison logic shown, receives criteria and sentiment of corresponding scraped reviews, extracted by the review criteria and sentiment extractor described hereinbefore, optionally along with respective review allocated weights.

The 'catalog offerings available criteria/details' to 'review(s) extracted criteria' comparison logic compares catalog available/existing offerings related details data to extracted review criteria and sentiment(s), outputting new criteria/sentiments not yet in the catalog offering details. The reviews weight factoring logic adjusts the weight(s) of the new criteria/sentiments based on the received review allocated weights. The digital catalog records generator, generates new digital catalog records, based on the review(s)/comment(s) extracted criteria/sentiments determined to be new (not yet in catalog offering) and the weights allocated thereto, and forwards them to the offering(s) details data augmenter of the catalog interface, for augmentation into existing digital catalog records.

The digital catalog records generator, may further generate, based on negative offering review(s), new digital catalog records to cause the digital catalog to stop, or deprioritize, the presentation of the corresponding offering(s) in the digital catalog; and/or to present additional offering(s) with substitutes to the specific product/service/offering feature(s) towards which the negative sentiment in the review(s) was expressed.

The negative sentiment report generator, receives details of product/service offering(s) and/or criteria/features thereof, that received negative sentiment within the review(s); compiles a corresponding report listing at least the negative sentiment expressed within the review and the respective offering(s), or offering(s) criteria/features, which are the target of the negative sentiment; and relays the report to one or more point(s) of contact associated with the product/service of the respective catalog offering(s). Review(s) extracted new criteria may include: use case, feature, usage combination, use outcome and/or outdated feature, criteria types, as described hereinbefore.

In FIGS. 4A-4D there are respectively shown: a digital catalog product description table, for an exemplary multi-purpose pair of bicycle, prior to a review based augmentation/enrichment process (4A); an exemplary system scraped review of the multipurpose pair of bicycle (4B); exemplary criteria and sentiments, extracted from the multipurpose pair of bicycle review (4C); and the digital catalog product description table, of the exemplary multipurpose pair of bicycle, following to a review based augmentation/enrichment process (4D).

The digital catalog product description table of FIG. 4A includes: digital catalog already-available offering descriptive text, the product criteria it relates to and the sentiment of the criteria. In the FIG. 4B review shown, extracted criteria and sentiments are highlighted over the entire text of the review. FIG. 4C lists for each of the review extracted criteria: the criteria type, the sentiment of the criteria, and the respective digital catalog augmentation, or negative sentiment reporting, action it triggers. In FIG. 4D the catalog product description table of FIG. 4A is shown following to the catalog augmentation based on FIG. 4C criteria and sentiment.

The present invention may include a digital catalog augmentation system with a digital catalog interface module to read from a digital catalog data storage, directly or indirectly, one or more catalog data records constituting an offer listing within a digital catalog, wherein the offer listing may include a description of a specific product or service offering and/or links to execute a transaction relating to the offering. The system may also include a Review Criteria and Sentiment Extractor (RCSE) to identify and convert one or more reviews posted on a review forum into one or more data records used to augment the offer listing within the digital catalog. The catalog interface may further be adapted to write to the digital catalog data storage, directly or indirectly, one or more catalog data records used to augment the offer listing within the digital catalog.

An offering listing within a digital catalog may be generated by rendering one or more data records and/or data files within a portion of the digital catalog. Offering listing is a description, optionally with pictures of the offering, a cost of the offering and/or instructions for purchasing the offering. The digital catalog may part of and/or generated by a digital commerce platform, retail or online.

According to embodiments, augmenting the offer listing within a digital catalog, such as an online catalog, may include: (a) adding one or more data records or files to be rendered as part of the offer listing in the digital catalog; (b) editing one or more data records or files to be rendered as part of the offer listing in the digital catalog; and (c) removing one or more data records or files to be rendered as part of the offer listing in the digital catalog. An added or modifier record may include at least one extracted offering related criteria and an extracted assessment or sentiment corresponding to the extracted criteria. An added or modifier record may expand a feature matrix generated as part of the digital catalog offer listing.

An RCSE according to embodiments may include a scraper to scan through one or more review forums and to identify and copy text from one or more reviews relating to the offer listing in the digital catalog. The scraper may be adapted to scrape reviews posted to a review forum integral or otherwise associated with a digital commerce platform of the digital catalog. The scraper may be adapted to scrape reviews posted to a review forum integral or otherwise associated with another digital platform such as an online blog, a reviews website, a social network, or any other server accessible through the internet.

An RCSE according to embodiment may include a natural language processor to extract from the copied text at least one offering related criteria associated with the offer listed in the digital catalog. The natural language processor may further be adapted to extract from the copied text at least one assessment of or sentiment towards the listed offering within a context of an extracted criteria.

As part of understanding and extracting information (offering related criteria, assessment, sentiment, etc.) from a review of an offering, the natural language processor and or another module integral or otherwise functionally associated with an RCSE, according to embodiments, may apply normalization logic to correct transliterated (mixed-code) language in a review, by: (a) referencing a knowledge base in various languages; or (b) converting transliterated review language into original scripts utilizing domain specific spell correction to obtain the nearest possible words. A natural language processor, or another module integral or otherwise functionally associated with an RCSE, according to embodiments, may be context aware, such that said processor cross-correlates pre-stored feature or attribute information of an offering which is a subject of a specific review, either a product or a service, as part of processing the review for criteria and sentiment extraction about the offering.

A digital catalog augmentation system according to embodiments may, upon extraction of a threshold number of reviews with negative sentiment towards a listed offering, may trigger one or more of: (a) generation of a report; (b) a change in placement of the offer listing within the digital catalog; (c) a change in catalog search engine result placement; and (d) a suspension or delisting of the offering from the catalog. According to further embodiments, detection of a review about an offering being posted with negative sentiment towards an offering may trigger an automated response to the review writer with a replacement offer and or a monetary compensation offer.

A digital catalog augmentation system according to embodiments may augment an offer listing within a digital catalog by providing links to an alternate offering, wherein the alternate offering may be selected: (a) when one or more reviews indicate superior properties or attributes of the alternate offering; (b) when one or more reviews indicate dissatisfaction with one or more properties, features or attributes of the listed offering and the alternate has a higher rating corresponding to the one or more properties, features or attributes; (c) when one or more reviews indicate an unmet expectation with regard to one or more properties, features, or attributes of the listed offering and the alternate offering is known to meet the expectation with regard to the one or more properties, features or attributes.

According to some embodiments, the digital catalog augmentation system may include a reviewer assessment module to assess a credibility of a poster of one or more offering reviews.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A digital catalog augmentation system for automated augmentation of an offer listing within a digital catalog of a plurality of offerings, the system comprising:

a processor configured to execute non-transitory machine readable instructions, wherein the processor is configured to:

obtain a plurality of reviews associated with at least one offering of the offer listing wherein the plurality of reviews comprise user opinions related to the offerings in unstructured text format and are scraped from one or more data sources;

process, using natural language processing, unstructured text of the plurality of reviews to identify one or more criteria associated with an offering within the offer listing and a contextual sentiment associated, wherein the natural language processing comprises at least the step of correcting transliterated (mixed-code) language in the plurality of reviews in which multiple languages are used within the same text section by:

(a) referencing to a knowledge base in various languages; or (b) converting transliterated review language into original scripts based on knowledge in the domain of respective product/service offerings in the digital catalog; and wherein the processor is context aware, such that said processor cross-correlates pre-stored feature or attribute information of an offering which is a subject of a specific review, either a product or a service, as part of processing the review for criteria and sentiment extraction about the offering;

identify a new criteria not previously associated with the offering within the digital catalog, and a contextual sentiment associated with the new criteria wherein the new criteria includes at least one of:

(1) features not mentioned in the catalog;
(2) suitability and/or use cases not mentioned in the catalog:
(3) compatibility and/or use combinations, with other products, not mentioned in the catalog; and/or
(4) possible outcomes of usage not mentioned in the catalog;

generate a modifier data record associated with the offering wherein the modifier data record comprises at least one of:

the identified a-new criteria, not previously associated with the offering within the digital catalog, and the contextual sentiment associated with the new criteria; or a negative sentiment associated with one or more criteria of the offering;

modify, based on the modifier data record, one or more data records associated with pre-stored feature or attribute information of the offering;

update the digital catalog based on the modified one or more data records associated with the offering such that the identified new criteria become searchable;

automatically augment the offer listing within the digital catalog based on the modified one or more data records; and one or more data store communicably coupled to the processor wherein the data store is configured to store one or more data records associated with the offer listing.

2. The digital catalog augmentation system according to claim 1, wherein a catalog interface is adapted to write to digital catalog data storage, directly or indirectly, the one or more modified data records used to augment the offer listing within the digital catalog.

3. The digital catalog augmentation system according to claim 1,
wherein the processor further comprises a scraper to scan through one or more review forums and to identify and copy text from one or more reviews relating to the offer listing in the digital catalog.

4. The digital catalog augmentation system according to claim 1, wherein said scraper is adapted to scrape reviews posted to a review forum integral or otherwise associated with a digital commerce platform of the digital catalog.

5. The digital catalog augmentation system according to claim 1, wherein said scraper is adapted to scrape reviews posted to a review forum integral or otherwise associated with another digital platform such as an online blog, a reviews website, a social network, or any other server accessible through the internet.

6. The digital catalog augmentation system according to claim 1,
wherein augmenting the offer listing includes:
(a) adding one or more data records or files to be rendered as part of the offer listing in the digital catalog;
(b) editing one or more data records or files to be rendered as part of the offer listing in the digital catalog; and
(c) removing one or more data records or files to be rendered as part of the offer listing in the digital catalog.

7. The digital catalog augmentation system according to claim 1, wherein an added or modifier record expands a feature matrix generated as part of the digital catalog offer listing.

8. The digital catalog augmentation system according to claim 1, wherein extraction of a threshold number of reviews with negative sentiment triggers one or more of:
   (a) generation of a report;
   (b) a change in placement of the offer listing within the digital catalog;
   (c) a change in catalog search engine result placement; and
   (d) a suspension or delisting of the offering from the catalog.

9. The digital catalog augmentation system according to claim 1, wherein the processor further comprises a reviewer assessment module adapted to assess credibility of a poster of one or more offering reviews.

10. The digital catalog augmentation system according to claim 1, wherein detection of a review about an offering being posted with negative sentiment towards the offering triggers an automated response to the review writer with a replacement offer and or a monetary compensation offer.

11. The digital catalog augmentation system according to claim 1, wherein augmenting the offer listing within the digital catalog includes providing links to an alternate offering, wherein the alternate offering is selected:
   (a) when one or more reviews indicate superior properties or attributes of the alternate offering;
   (b) when one or more reviews indicate dissatisfaction with one or more properties, features or attributes of the listed offering and the alternate has a higher rating corresponding to the one or more properties, features or attributes; or
   (c) when one or more reviews indicate an unmet expectation with regard to one or more properties, features, or attributes of the listed offering and the alternate offering is known to meet the expectation with regard to the one or more properties, features or attributes.

* * * * *